US006791789B2

(12) United States Patent
Rathweg

(10) Patent No.: US 6,791,789 B2
(45) Date of Patent: Sep. 14, 2004

(54) THERMAL INSULATOR FOR PROTECTING A STORAGE TAPE IN A TAPE DRIVE

(75) Inventor: Christopher Rathweg, Louisville, CO (US)

(73) Assignee: Quantum Corporation, San Jose, CA (US)

( * ) Notice: Subject to any disclaimer, the term of this patent is extended or adjusted under 35 U.S.C. 154(b) by 19 days.

(21) Appl. No.: 10/318,995

(22) Filed: Dec. 12, 2002

(65) Prior Publication Data

US 2004/0114272 A1 Jun. 17, 2004

(51) Int. Cl.$^7$ .............................................. G11B 15/18
(52) U.S. Cl. ...................................................... 360/93
(58) Field of Search .................................. 360/93–96.6

(56) References Cited

U.S. PATENT DOCUMENTS 4,608,615 A * 8/1986 Zeavin ....................... 360/96.5
5,923,496 A   7/1999 Perona

* cited by examiner

Primary Examiner—Robert S. Tupper
(74) Attorney, Agent, or Firm—James P. Broder; Steven G. Roeder

(57) ABSTRACT

A tape drive (10) for use with a cartridge (24) having a storage tape (30) that moves along a tape path (32) includes a drive housing (12) defining a drive interior (62), a circuit assembly (42) that generates heat, and a thermal insulator (44). In one embodiment, the thermal insulator (44) is positioned between a portion of the storage tape (30) and the circuit assembly (42). The thermal insulator (44) can be formed from a flexible, plastic material and/or can have a thermal conductivity of less than approximately 50 W/mK to decrease the transfer of heat between the circuit assembly (42) and the storage tape (30). The drive interior (62) can have a first region (64) that includes a portion of the tape path (32), and a second region (66) that includes the circuit assembly (42). The drive housing (62) also includes a plurality of ventilation apertures (74) positioned so that the area of the ventilation apertures (74) extending between the exterior of the drive housing (12) and the first region (64) can be less than approximately 200 percent of the area of the ventilation apertures (74) extending between the exterior of the drive housing (12) and the second region (66). A tape drive assembly (72) includes the tape drive (10) and an air mover (72) positioned outside of the drive housing (12). The air mover (72) moves air through the ventilation apertures (74) of the first region (64) and the second region (66) at a ratio of less than approximately 2:1.

32 Claims, 3 Drawing Sheets

THERMAL INSULATOR FOR PROTECTING A STORAGE TAPE IN A TAPE DRIVE

FIELD OF THE INVENTION

The present invention relates generally to tape drives and devices used in tape drives to protect storage media from damage.

BACKGROUND

Tape drives that utilize a cartridge having a cartridge reel and a magnetic storage tape are commonly used to store relatively large amounts of data in digital form. The tape drive includes a tape head, a take-up reel and a plurality of spindle motors that operate to move the storage tape back and forth across the tape head, between the cartridge reel and the take-up reel. Further, the tape drive includes a printed circuit board assembly having a relatively complex system of various electrical components that control operation of the tape drive, and facilitate reading and writing of the data.

In an effort to increase the storage capacity of the cartridge, the storage tape is constructed from a material having a decreased thickness, which increases the length of storage that can be wound onto the cartridge reel. Additionally, magnetic storage tape is typically formed from materials that have a relatively low heat tolerance. Consequently, storage tape that is exposed to increased temperatures can become irreparably damaged, resulting in loss of data and/or inoperability of the cartridge.

Unfortunately, operation of the spindle motors and the drive circuitry generates a significant amount of heat within the tape drive. One attempt to reduce the transfer of heat to the storage tape includes physically positioning the spindle motors and the drive circuitry away from the storage tape. Unfortunately, over time, the heat generated by these structures nevertheless radiates to areas of the tape drive through which the storage tape moves. Another attempt includes using external fans that circulate air through air holes in the drive housing near the storage tape in order to keep the storage tape relatively cool. However, excessive air movement near the storage tape can cause unwanted movement of the storage tape relative to the tape head, which can lead to reading and/or writing errors. Further, introducing external air into the drive housing can expose the storage tape to contaminants, which can potentially damage the storage tape and the tape head.

In light of the above, the need exists to provide a tape drive that decreases the transfer of heat to the storage tape. Another need exists to provide a tape drive that reduces reading and/or writing errors caused by unwanted tape movement. A further need exists to decrease contaminants near the storage tape and the tape head.

SUMMARY

The present invention is directed to a tape drive for use with a cartridge having a storage tape that moves along a tape path during operation of the tape drive. The tape drive includes a drive housing defining a drive interior, a circuit assembly including an electrical component that generates heat, and a thermal insulator that is coupled to the drive housing. In one embodiment, the thermal insulator is positioned substantially between a portion of the storage tape and the circuit assembly. Moreover, the thermal insulator can be formed from a flexible, plastic material and/or can have a thermal conductivity of less than approximately 50 W/mK. With this design, the thermal insulator decreases the transfer of heat between the electrical component and the tape path during operation of the tape drive. In alternative embodiments, the thermal insulator has a thermal conductivity of less than approximately 10 W/mK or less than 1 W/mK.

In another embodiment, the drive interior has a first region that includes a portion of the tape path, and a second region that includes the circuit assembly. The drive housing also includes a plurality of ventilation apertures that extend between an exterior of the drive housing and the first region, and between the exterior of the drive housing and the second region. The area of the ventilation apertures extending between the exterior of the drive housing and the first region can be less than approximately 200 percent of the area of the ventilation apertures extending between the exterior of the drive housing and the second region. Alternatively, the area of the ventilation apertures extending between the exterior of the drive housing and the first region can be less than approximately 100 percent, less than approximately 50 percent, or less than approximately 25 percent of the area of the ventilation apertures extending between the exterior of the drive housing and the second region.

The present invention is also directed toward a tape drive assembly including the tape drive and an air mover positioned outside of the drive housing. The air mover moves air through the ventilation apertures of the first region and the second region at a ratio of less than approximately 2:1.

The present invention is also directed to a method for manufacturing a tape drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
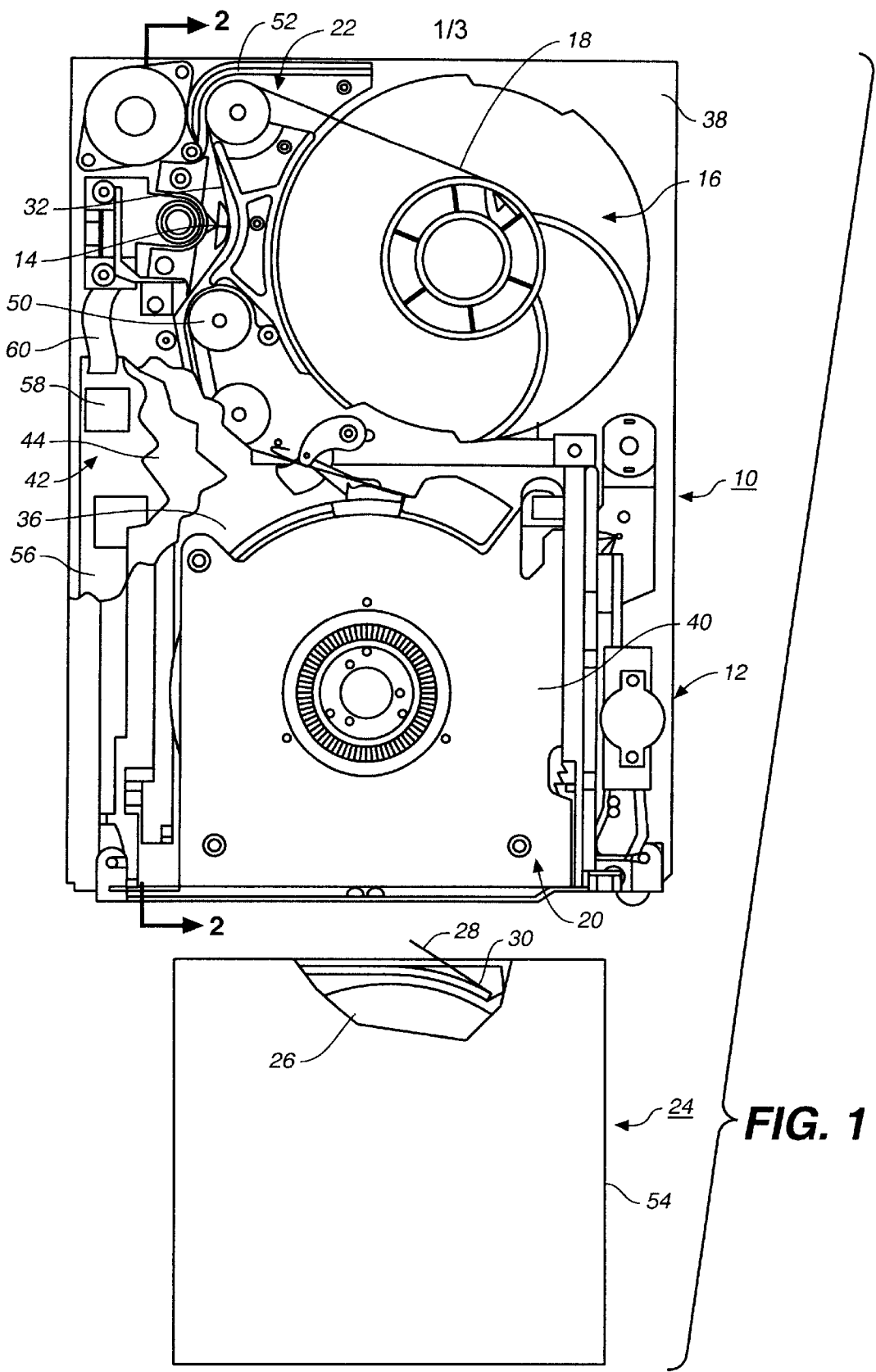
FIG. 1 is a partly cutaway, top view of a tape drive and a cartridge, with a portion of a drive housing of the tape drive removed for clarity, the tape drive having features of the present invention.

FIG. 1 is a partly cutaway, top view of a tape drive 10 having features of the present invention. In this embodiment, the tape drive 10 includes a drive housing 12, a head assembly 14, a take-up reel 16, a drive leader 18, a cartridge receiver 20, and a guide assembly 22. The tape drive 10 is typically used with a cartridge 24 that includes a cartridge reel 26, a cartridge leader 28, and a storage tape 30 that moves along a tape path 32 within the tape drive 10. In the embodiment illustrated in FIG. 1, the tape drive 10 also includes one or more of a support plate 38, a cartridge support 40, a base plate 36, a circuit assembly 42, and a thermal insulator 44.

A detailed description of various components of the tape drive 10, is provided in U.S. Pat. No. 5,371,638, issued to Saliba, and assigned to Quantum Corporation, the Assignee of the present invention. The contents of U.S. Pat. No. 5,371,638 are incorporated herein by reference.

The head assemblies 14 read data from and/or write data to the storage tape 30. The design and number of head assemblies 14 can vary depending upon the requirements of the tape drive 10. For example, in the embodiment illustrated in FIG. 1, the tape drive 10 includes a single head assembly 14. Alternatively, the tape drive 10 can include a plurality of head assemblies 14.

The guide assembly 22 guides movement of the storage tape 30 back and forth along the tape path 32 between the cartridge reel 26 of the cartridge 24 and the take-up reel 16 of the tape drive 10, across a portion of the head assembly 14. The guide assembly 22 includes one or more tape rollers 50 and one or more tape guides 52. For example, the guide assembly 22 illustrated in FIG. 1 includes three tape rollers 50. However, the guide assembly 22 can include more or less than three tape rollers 50.

Each cartridge 24 illustrated in FIG. 1 includes a substantially rectangular cartridge housing 54 that can enclose the cartridge reel 26 and the storage tape 30. However, the cartridges 24 can vary in size and shape. For example, cartridges 24 suitable for use with the tape drive 10 described herein are sold by Quantum Corporation. The cartridge housing 54 includes a cartridge door (not shown for clarity) that pivots between an open door position which allows the tape 30 to exit the cartridge housing 54, and a closed door position which confines the tape 30 within the cartridge housing 54.

The storage tape 30 stores data in a form that can be subsequently retrieved. A magnetic storage tape 30 is commonly used to store data in digital form. The storage tape 30 can have a tape width of at least approximately four millimeters to sixteen millimeters. The storage tape 30 can also be wider or narrower than this range. The thickness of the storage tape 30 can likewise vary. Thicknesses of approximately one-half mil are relatively common, although thinner or thicker tape 30 can be used. In general, thinner tape 30 tends to be less rigid than thicker tape 30, which can lead to decreased control over movement of the tape 30 and increased sensitivity to heat during usage within the tape drive 10, which can lead to a higher susceptibility to heat damage.

For example, depending upon the thickness and composition of the storage tape 30, damage can occur when the storage tape 30 is subjected to temperatures of approximately 120 degrees Fahrenheit (49 degrees Celsius) or greater anywhere along the tape path 32 or within the cartridge 24. Thus, maintaining a relatively low temperature in the vicinity of the storage tape 30 is critical to reducing the likelihood of damage to the tape 30.

The base plate 36 can support the support plate 38 and/or the cartridge support 40, as illustrated in FIG. 1. The design, including the configuration, positioning and materials of the base plate 36 can vary depending upon the design requirements of the tape drive 10. The base plate 36 can be integrally formed with the drive housing 12. Alternatively, the base plate 36 can be separately formed and secured to the drive housing 12.

The support plate 38 supports various components of the tape drive 10. The design, including the configuration, positioning and materials of the support plate 38 can vary depending upon the design requirements of the tape drive 10. In one embodiment, the support plate 38 is secured to the base plate 36. Alternatively, the support plate 38 can be secured to another component of the tape drive 10. The support plate 38 can support the head assembly 14, one or more tape rollers 50, one or more tape guides 52 and/or the take-up reel 16, as non-exclusive examples. The support plate 38 can be formed from suitably rigid materials such as aluminum or other metals, for example, although other suitable materials can be used. Further, the support plate 38 can be formed separately from the drive housing 12. Alternatively, the support plate 38 can be integrally formed with the drive housing 12 or the base plate 36.

The cartridge support 40 can support the cartridge 24 when the cartridge 24 is positioned within the cartridge receiver 20. The design, including the configuration, positioning and materials of the cartridge support 40 can vary. In one embodiment, the cartridge support 40 is secured to the base plate 36. Alternatively, the cartridge support 40 can be secured to another component of the tape drive 10. The cartridge support 40 can be formed from various materials such as stainless steel, aluminum or other alloys, as non-exclusive examples. The cartridge support 40 can be formed separately from the drive housing 12. Alternatively, the cartridge support 40 can be integrally formed with the drive housing 12 or the base plate 36.

The circuit assembly 42 can receive, process, store and/or transmit data used during operation of the tape drive 10. The specific components and the positioning of the circuit assembly 42 can vary. For example, the circuit assembly 42 can include one or more circuit substrates 56, one or more electrical components 58, one or more flex circuits 60, conductors (not shown), power connections (not shown) and/or other relevant electronic circuitry. The types of electrical components 58 in the circuit assembly 42 can vary. Non-exclusive examples of electrical components 58 include processors, resistors, integrated circuits, transistors and the like.

In one embodiment, a substantial portion of the circuit assembly 42 is positioned on an opposite side of the base plate 36 from the support plate 38 and/or the cartridge support 40. In this embodiment, one or more flex circuits 60 may penetrate the base plate 36, and can therefore be positioned on both sides of the base plate 36. However, in this embodiment, one or more of the electrical components 58 are positioned on an opposite side of the base plate 36 from the support plate 38 and/or the cartridge support 40.

Each circuit substrate 56 is formed from relatively rigid materials such as plastics, hardened epoxy resins, and/or ceramics. Alternatively, other suitable materials can be used to form the circuit substrates 56. The electrical components 58 and/or flex circuits 60 can be at least partially secured to one or more of the circuit substrates 56.

The circuit assembly 42 can process the data, which can then be transmitted to a host computer (not shown), to other components of the tape drive 10 such as the head assembly 14, to the storage tape 30 of the cartridge 24 and/or to a tape library (not shown). The circuit assembly 42 can include a printed circuit board assembly (PCBA) or another appropriate type of assembly.

The electrical components 58 of the circuit assembly 42 can generate a significant amount of heat within the drive housing 12 of the tape drive 10. For example, during operation of the tape drive 10, the electrical components 58 can reach temperatures of approximately 176 degrees F. (80 degrees C.) or higher. Larger electrical components 58, e.g., read channels, and/or an increased number of electrical components 58 result in the generation of more heat within the drive housing 12 of the tape drive 10.

The thermal insulator 44 reduces the amount of heat that reaches the storage tape 30 during operation of the tape drive 10. The thermal insulator 44 can effectively act as a heat shield that is positioned so that the temperature increase within the drive housing 12 caused by the circuit assembly 42 is at least partly confined to an area within the drive housing 12 that is somewhat remote from the storage tape 30 and/or the tape path 32. Stated another way, the storage tape 30 is at least partially insulated from the heat generated by the circuit assembly 42, which decreases the likelihood of damage to the storage tape 30.

The design of the thermal insulator 44, including the configuration, the materials used to form the thermal insulator 44, and the positioning of the thermal insulator 44, can each be varied. Several examples of such variations are provided herein. However, the examples provided herein are not intended to be all-inclusive of all possible embodiments of the tape drive 10, and are therefore not intended to limit the scope of the present invention in any way.

In one embodiment, the thermal insulator 44 can be formed in shapes that coincide with the positioning of the electrical components 58 relative to the tape path 32. In another embodiment, the thermal insulator 44 is positioned directly between at least one of the electrical components 58 and the tape path 32 of the storage tape 30. In alternate embodiments, the thermal insulator 44 is configured to be directly between each of the electrical components 58 and the tape path 32. In still alternative embodiments, the thermal insulator 44 is positioned directly between a portion of the circuit assembly 42 and the tape path 32 near the head assembly 14 and/or the guide assembly 22. In additional alternative embodiments, the thermal insulator 44 is positioned directly between a portion of the circuit assembly 42 and at least approximately 5 percent, 10 percent, 20 percent, 35 percent, 50 percent, 75 percent, 90 percent or 100 percent of the tape path 32 outside of the cartridge 24.

The thermal insulator 44 can be rectangular, trapezoidal, elliptical, circular, or any other suitable shape. Moreover, the thermal insulator 44 can be a continuous shape or can be discontinuous. For example, the thermal insulator 44 can be formed into a plurality of separate, detached sections.

The thermal insulator 44 can be formed from various materials having a relatively low thermal conductivity. For example, the thermal insulator 44 can be substantially formed from a material having a thermal conductivity of less than approximately 50 W/mK. In alternative embodiments, the thermal insulator 44 can be formed from a material having a thermal conductivity of less than approximately 25 W/mK, 10 W/mK, 5 W/mK, 1 W/mK, 0.5 W/mK, 0.1 W/mK or 0.05 W/mK. For instance, the thermal insulator 44 can be formed from various plastic materials, including a thin strong polyester film, also sold under the trademark "Mylar". The thermal insulator 44 can be formed from any of various organic compounds produced by polymerization, capable of being molded, extruded, cast into various shapes and films, or drawn into filaments used as textile fibers. Moreover, the thermal insulator 44 can be formed from a ceramic material, epoxy resin or any other materials having a suitable thermal conductivity within the given ranges.

The relatively low thermal conductivity slows, decreases and inhibits the transfer of heat from the circuit assembly 42 to the storage tape 30 and/or the tape path 32. As a result, a lower temperature can be maintained near the storage tape 30, thereby decreasing the potential for heat damage to the tape 30, and increasing the lifespan of the tape 30.

Figure 2A:
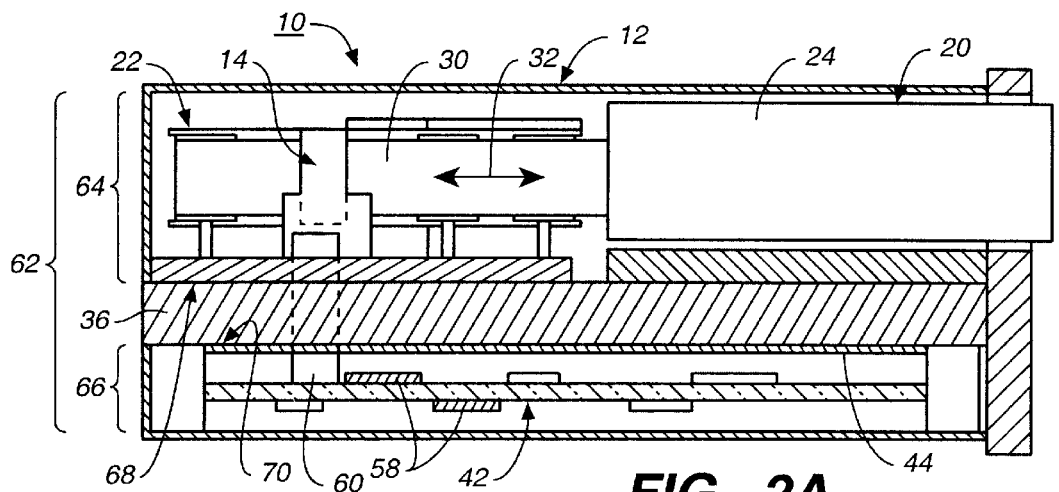
FIG. 2A is a simplified, cross-sectional view of the tape drive including a cartridge receiver taken on line 2—2 of FIG. 1, and the cartridge inserted into the cartridge receiver.

FIG. 2A is a cross-sectional view of the tape drive 10 illustrated in FIG. 1, and a cartridge 24 positioned within the cartridge receiver 20. In the embodiment illustrated in FIG. 2A, the drive housing 12 generally includes a drive interior 62 having a first region 64 and a second region 66. In this embodiment, the first region 64 is separated from the second region 66 by the base plate 36. The base plate 36 includes a first surface 68 that generally faces the first region 64, and a second surface 70 that generally faces the second region 66.

In this embodiment, the first region 64 includes the head assembly 14 (illustrated partially in phantom), the guide assembly 22 and/or the storage tape 30 that generally follows the tape path (indicated by bidirectional arrow 32) during operation of the tape drive 10. The second region 66 can include a substantial portion, if not all, of the circuit assembly 42. As previously provided, some components of the circuit assembly 42, such as one or more of the flex circuits 60 (one flex circuit 60 is illustrated partially in phantom in FIG. 2A) can penetrate the base plate 36 and/or the thermal insulator 44, and can therefore be present in both the first region 64 and the second region 66.

In the embodiment illustrated in FIG. 2A, the thermal insulator 44 is secured to the second surface 70 of the base plate 36. The thermal insulator 44 can cover the entire second surface 70 of the base plate 36, as illustrated in FIG. 2A. In alternative embodiments, the thermal insulator 44 can cover at least approximately 90 percent, 75 percent, 50 percent, 25 percent or 10 percent of the second surface 70 of the base plate 36.

Because the thermal insulator 44 is positioned substantially between one or more electrical components 58 of the circuit assembly 42 and at least a portion of the storage tape 30 and/or the cartridge 24 during operation of the tape drive 10, at least some of the heat that would otherwise be transferred to the first region 64 remains within the second region 66. With this design, the storage tape 30 is not subjected to increased temperatures generated by the circuit assembly 42 within the second region 66.

Figure 2B:
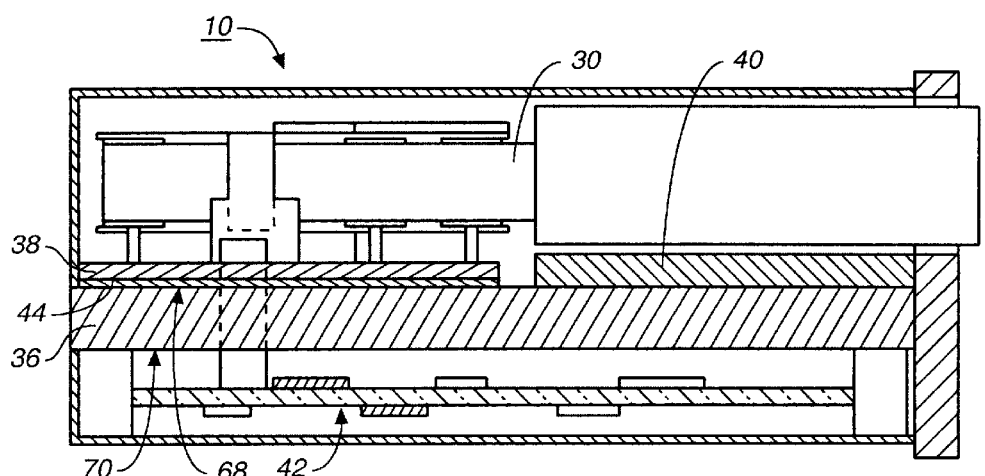
FIG. 2B is a simplified, cross-sectional view of another embodiment of the tape drive and the cartridge inserted into the cartridge receiver.

FIG. 2B illustrates another embodiment of the tape drive 10 including the thermal insulator 44. In this embodiment, the thermal insulator 44 is secured to the first surface 68 of the base plate 36. More specifically, the thermal insulator 44 is positioned between the base plate 36 and the support plate 38. However, the thermal insulator 44 is positioned between (i) at least a portion of the storage tape 30 and/or the tape path 32 during operation of the tape drive 10 and (ii) at least a portion of the circuit assembly 42. In an alternative embodiment, the thermal insulator could also extend between the cartridge support 40 and the base plate 36.

Figure 2C:
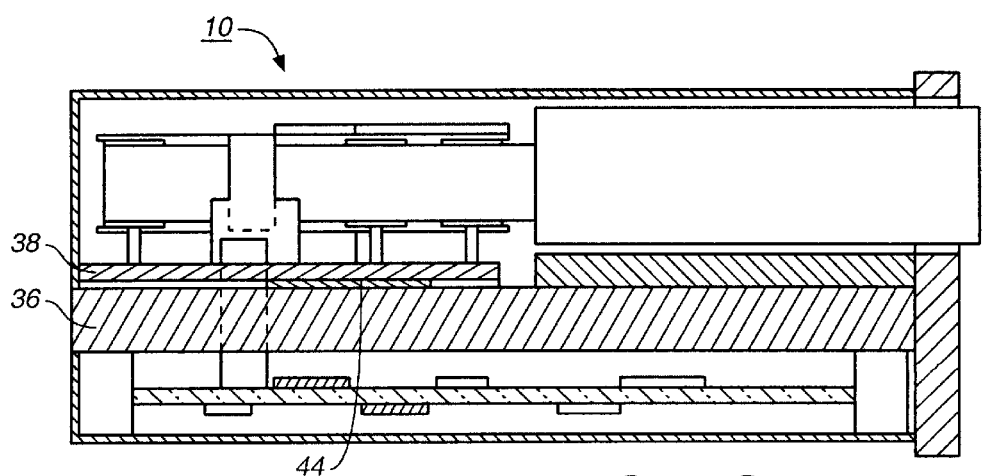
FIG. 2C is a simplified, cross-sectional view of yet another embodiment of the tape drive and the cartridge inserted into the cartridge receiver.

FIG. 2C illustrates yet another embodiment of the tape drive 10 including the thermal insulator 44. In this embodiment, the thermal insulator 44 is positioned between the base plate 36 and the support plate 38. Further, the size of the thermal insulator 44 can be varied so that the thermal insulator 44 has a footprint that is smaller than a footprint of the support plate 38, as illustrated in FIG. 2C. In an alternative embodiment, the thermal insulator 44 can have a footprint that is larger than a footprint of the support plate 38.

In still an alternative embodiment (not shown), the thermal insulator 44 can be positioned in other locations within the drive housing 12. In one embodiment, the thermal insulator 44 is positioned between one or more electrical components 58 or other heat-generating structures within the drive housing 12 and the tape path 32 and/or cartridge 24. For example, the thermal insulator 44 can be positioned between a motor (not shown) and the tape path 32, between a motor and the cartridge 24, or between the cartridge support 40 and the base plate 36.

Figure 3:
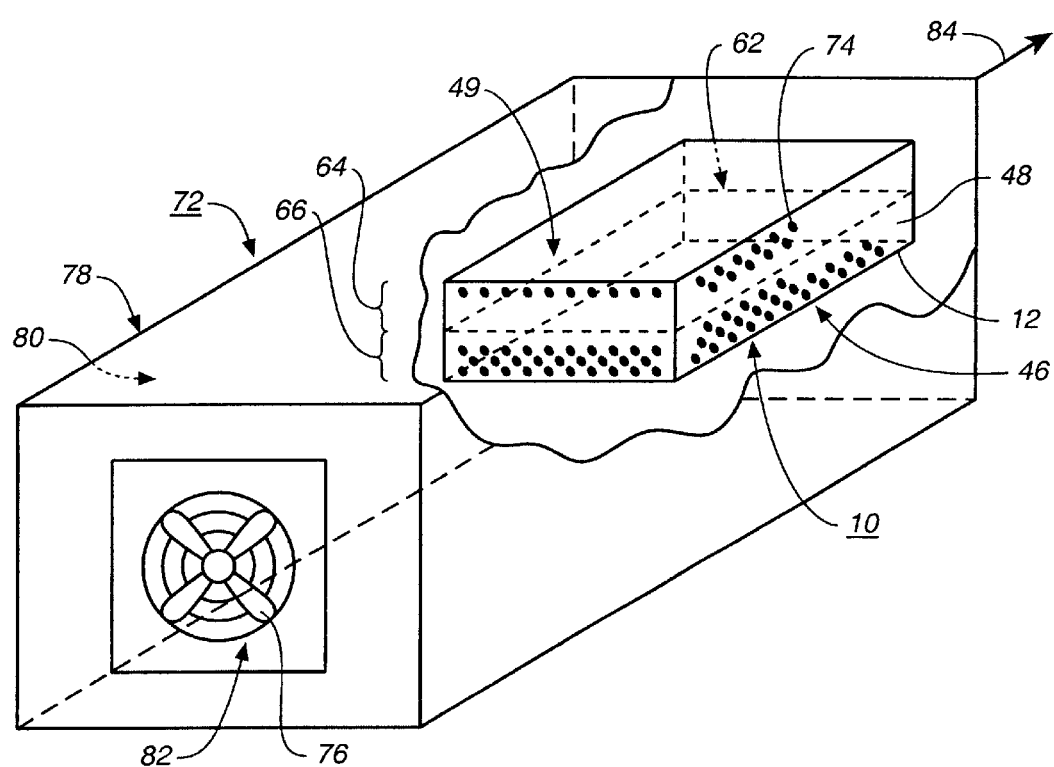
FIG. 3 is a partly cut-away, perspective view of a tape drive assembly having features of the present invention.

FIG. 3 illustrates the tape drive 10, which is included as part of a tape drive assembly 72. The tape drive 10 shown in FIG. 3 includes the drive housing 12, which retains the various components of the tape drive 10. The drive housing 12 illustrated in FIG. 3 includes a base 46, a plurality of spaced apart side walls 48 and a cover 49. The drive housing 12 further includes a plurality of ventilation apertures 74 that extend through one or more side walls 48 of the drive housing 12 into the drive interior 62 (ventilation apertures 74 are only illustrated on two side walls 48 in FIG. 3 for clarity). The tape drive assembly 72 illustrated in FIG. 3 also includes an air mover 76, and an assembly housing 78 that defines an assembly cavity 80 which substantially encloses the tape drive 10.

As previously provided, the storage tape 30 (illustrated in FIGS. 1 and 2A–2C) can be particularly sensitive to increased temperatures. Because various components of the tape drive 10 generate heat during operation of the tape drive 10, a cooling system such as the air mover 76 is beneficial to reducing the temperature within the drive housing 12 of the tape drive 10. In this embodiment, the air mover 76 pulls air from outside the assembly housing 78 (indicated by directional arrow 82), and forces the air through the ventilation apertures 74 of the drive housing 12 of the tape drive 10. The air can then circulate within the drive interior 62 and exit through the side wall 48 at the front of the drive housing 12 (indicated by directional arrow 84) and/or through the ventilation apertures 74.

As provided herein, the thermal insulator 44 (illustrated in FIGS. 1 and 2A–2C) reduces the transfer of heat from the second region 66 to the first region 64. Stated another way, because of the presence and positioning of the thermal insulator 44, a temperature increase in the second region 66 will not cause as great an increase of the temperature in the first region 64 during operation of the tape drive 10. Consequently, the number of ventilation apertures 74 that extend through the first region 64 of the drive housing can be reduced because the requirement for additional cooling of the first region 64 is decreased. For example, the ratio of the air forced through the first region 64 by the air mover 76 to the air moved through the second region 66 by the air mover 76 can be less than approximately 2:1. In alternative embodiments, the ratio of the air forced through the first region 64 by the air mover 76 to the air moved through the second region 66 by the air mover 76 can be less than approximately 1.5:1, 1:1, 3:4, 1:2, 1:3 or 1:4. Still alternatively, a different ratio can be used depending upon the requirements of the tape drive 10 and/or the tape drive assembly 72.

Further, the area of the ventilation apertures 74 in the first region 64 can be less than approximately 200 percent of the area of the ventilation apertures 74 in the second region 66. In alternative embodiments, the area of the ventilation apertures 74 in the first region 64 can be less than approximately 150 percent, 100 percent, 75 percent, 50 percent or 25 percent of the area of the ventilation apertures 74 in the second region 66. Still alternatively, a different percentage can be used depending upon the requirements of the tape drive 10 and/or the tape drive assembly 72. With this design, moving less air through the first region 64 results in a decrease in noise and unwanted vibration of the storage tape 30 caused by air turbulence within the first region 64. Moreover, less air moving near the storage tape 30 decreases the likelihood of contaminants being introduced into the first region 64 near the head assembly 14 (illustrated in FIGS. 1 and 2A–2C) and the storage tape 30.

The tape drive 10 and/or the tape drive assembly 72 can also be installed within or connected to a computer (not shown). Further, the tape drive 10 and/or the tape drive assembly 72 can be included as part of a tape drive array (not shown). Alternatively, the tape drive 10 and/or tape drive assembly can be utilized as part of a tape library (not shown).

While the particular tape drive 10 and tape drive assembly 72 as herein shown and disclosed in detail are fully capable of obtaining the objects and providing the advantages herein before stated, it is to be understood that they are merely illustrative of the presently preferred embodiments of the invention and that no limitations are intended to the details of construction or design herein shown other than as described in the appended claims.

What is claimed is:

1. A tape drive for use with a cartridge, the cartridge having a storage tape that moves along a tape path during operation of the tape drive, the tape drive comprising:
   a drive housing defining a drive interior, the drive interior receiving a portion of the cartridge;
   a circuit assembly that is positioned within the drive interior, the circuit assembly including an electrical component, the electrical component generating heat; and
   a thermal insulator that is fixedly coupled to the drive housing, the thermal insulator being positioned substantially between a portion of the storage tape and the circuit assembly during operation of the tape drive, the thermal insulator having a thermal conductivity of less than approximately 50 W/mK that decreases the transfer of heat between the electrical component and the tape path during operation of the tape drive.

2. The tape drive of claim 1 wherein the thermal insulator is positioned directly between the electrical component and the portion of the storage tape during operation of the tape drive.

3. The tape drive of claim 1 further comprising a base plate positioned substantially between the tape path and the circuit assembly, wherein the thermal insulator is secured to the base plate.

4. The tape drive of claim 1 wherein the thermal insulator is formed from a plastic material.

5. The tape drive of claim 1 wherein the thermal insulator is formed from a flexible material.

6. The tape drive of claim 1 wherein the thermal insulator has a thermal conductivity of less than approximately 10 W/mK.

7. The tape drive of claim 1 wherein the thermal insulator has a thermal conductivity of less than approximately 1 W/mK.

8. The tape drive of claim 1 wherein the drive interior includes a first region that includes a portion of the tape path, and a second region that includes the circuit assembly, wherein the drive housing substantially encircles the first and second regions, the drive housing including a plurality of ventilation apertures that extend between an exterior of the drive housing and the first region, and between the exterior of the drive housing and the second region.

9. The tape drive of claim 8 wherein the area of the ventilation apertures extending between the exterior of the drive housing and the first region is less than approximately 200 percent of the area of the ventilation apertures extending between the exterior of the drive housing and the second region.

10. The tape drive of claim 8 wherein the area of the ventilation apertures extending between the exterior of the drive housing and the first region is less than approximately 100 percent of the area of the ventilation apertures extending between the exterior of the drive housing and the second region.

11. The tape drive of claim 8 wherein the area of the ventilation apertures extending between the exterior of the drive housing and the first region is less than approximately 50 percent of the area of the ventilation apertures extending between the exterior of the drive housing and the second region.

12. A tape drive assembly including the tape drive of claim 8 and an air mover positioned outside of the drive housing, the air mover moving air through the ventilation apertures of the first region and the second region at a ratio of less than approximately 2:1.

13. A tape drive assembly including the tape drive of claim 8 and an air mover positioned outside of the drive housing, the air mover moving air through the ventilation apertures of the first region and the second region at a ratio of less than approximately 1:1.

14. A tape drive assembly including the tape drive of claim 8 and an air mover positioned outside of the drive housing, the air mover moving air through the ventilation apertures of the first region and the second region at a ratio of less than approximately 1:2.

15. A tape drive for use with a cartridge, the cartridge having a storage tape that moves along a tape path during operation of the tape drive, the tape drive comprising:
a base plate; and
a drive housing defining a drive interior that receives a portion of the cartridge, the drive interior having a first region and a second region that is separated from the first region by the base plate, the first region including a portion of the tape path, the second region including an electrical component, the drive housing including a plurality of ventilation apertures that extend between an exterior of the drive housing and the drive interior, the total area of the ventilation apertures extending between the exterior of the drive housing and the first region being less than approximately 200 percent of the total area of the ventilation apertures extending between the exterior of the drive housing and the second region.

16. The tape drive of claim 15 wherein the total area of the ventilation apertures extending between the exterior of the drive housing and the first region is less than approximately 100 percent of the total area of the ventilation apertures extending between the exterior of the drive housing and the second region.

17. The tape drive of claim 15 wherein the total area of the ventilation apertures extending between the exterior of the drive housing and the first region is less than approximately 50 percent of the total area of the ventilation apertures extending between the exterior of the drive housing and the second region.

18. The tape drive of claim 15 further comprising a thermal insulator that is fixedly coupled to the drive housing, the thermal insulator being positioned substantially between a portion of the storage tape and the electrical component during operation of the tape drive, the thermal insulator having a thermal conductivity of less than approximately 50 W/mK that decreases the transfer of heat between the electrical component and the storage tape during operation of the tape drive.

19. The tape drive of claim 18 wherein the thermal insulator has a thermal conductivity of less than approximately 10 W/mK.

20. The tape drive of claim 18 wherein the thermal insulator has a thermal conductivity of less than approximately 1 W/mK.

21. The tape drive of claim 18 wherein the thermal insulator is positioned directly between the electrical component and the portion of the storage tape during operation of the tape drive.

22. The tape drive of claim 18 wherein the thermal insulator is secured to the base plate.

23. The tape drive of claim 18 wherein the thermal insulator is formed from a flexible, plastic material.

24. A tape drive assembly including the tape drive of claim 15 and an air mover positioned outside the drive interior, the air mover moving air through the first region and the second region at a ratio of less than approximately 2:1.

25. A tape drive assembly including the tape drive of claim 15 and an air mover positioned outside the drive interior, the air mover moving air through the first region and the second region at a ratio of less than approximately 1:1.

26. A tape drive assembly including the tape drive of claim 15 and an air mover positioned outside the drive interior, the air mover moving air through the first region and the second region at a ratio of less than approximately 1:2.

27. A method of manufacturing a tape drive that receives a cartridge having a storage tape that moves along a tape path during operation of the tape drive, the method comprising the steps of:
fixedly coupling a thermal insulator having a thermal conductivity of less than approximately 50 W/mK to a drive housing of the tape drive; and
positioning the thermal insulator substantially between an electrical component of the tape drive and the storage tape during operation of the tape drive.

28. The method of claim 27 further comprising the steps of positioning the tape path in a first region within the drive housing, positioning the electrical component in a spaced apart second region within the drive housing, and moving air through the first region and the second region at a ratio of less than approximately 2:1.

29. The method of claim 27 further comprising the steps of positioning the tape path in a first region within the drive housing, positioning the electrical component in a spaced apart second region within the drive housing, and moving air through the first region and the second region at a ratio of less than approximately 1:1.

30. The method of claim 27 further comprising the steps of positioning the tape path in a first region within the drive housing, positioning the electrical component in a spaced apart second region within the drive housing, and moving air through the first region and the second region at a ratio of less than approximately 1:2.

31. The method of claim 27 wherein the step of positioning the thermal insulator includes positioning the thermal insulator having a thermal conductivity of less than approximately 1 W/mK.

32. A tape drive for use with a cartridge, the cartridge having a storage tape that moves along a tape path during operation of the tape drive, the tape drive comprising:

a base plate; and a drive housing defining a drive interior that receives a portion of the cartridge, the drive interior having a first region and a second region that is separated from the first region by the base plate, the first region including a portion of the tape path, the second region including an electrical component, the drive housing including a plurality of ventilation apertures that extend between an exterior of the drive housing and the drive interior, the total area of the ventilation apertures extending between the exterior of the drive housing and the first region being less than approximately 100 percent of the total area of the ventilation apertures extending between the exterior of the drive housing and the second region; and a thermal insulator that is fixedly coupled to the drive housing, the thermal insulator being positioned substantially between a portion of the storage tape and the electrical component during operation of the tape drive, the thermal insulator having a thermal conductivity of less than approximately 50 W/mK that decreases the transfer of heat between the electrical component and the storage tape during operation of the tape drive.

* * * * *